United States Patent [19]

Acharya et al.

[11] Patent Number: 4,904,452
[45] Date of Patent: Feb. 27, 1990

[54] INNER CORE HEATING IN FLUIDIZED BED

[75] Inventors: Arun Acharya, East Amherst; William E. Be Vier, Kenmore, both of N.Y.

[73] Assignee: Union Carbide Chemicals and Plastics Company Inc., Danbury, Conn.

[21] Appl. No.: 175,902

[22] Filed: Mar. 31, 1988

[51] Int. Cl.⁴ .............................................. F27B 15/14
[52] U.S. Cl. .................... 422/146; 165/104.16; 422/198; 422/199; 422/202
[58] Field of Search ............... 422/146, 147, 198, 199, 422/200, 201, 202; 165/104.16

[56] References Cited

U.S. PATENT DOCUMENTS

| | | | |
|---|---|---|---|
| 2,606,144 | 8/1952 | Leffer | 422/146 X |
| 3,020,129 | 2/1962 | Herrick | 422/146 X |
| 3,288,567 | 11/1966 | Graham | 422/147 |
| 3,376,109 | 4/1968 | Stedman | 422/198 X |
| 3,390,078 | 6/1968 | Hatch | 422/146 X |
| 3,826,739 | 7/1974 | Junichi Kubo et al. | 208/157 |
| 4,158,695 | 6/1979 | Ishizuka et al. | 422/241 X |
| 4,176,710 | 12/1979 | Gansauge et al. | 165/104.16 X |
| 4,557,904 | 12/1985 | Brod et al. | 422/146 |
| 4,559,719 | 12/1985 | Dodson | 422/146 X |
| 4,567,940 | 2/1986 | Klaren | 422/146 X |

Primary Examiner—Robert J. Hill
Assistant Examiner—Amalia L. Santiago
Attorney, Agent, or Firm—Morris N. Reinisch

[57] ABSTRACT

An improved heated fluidized bed reactor and a method of heating such reactor wherein a means defining an annular heated fluidized bed reaction zone is heated by a first heat source supplying heat to the outer periphery of the fluidized bed reaction zone and a second heat source supplying heat to the inner boundary of the annular fluidized bed reaction zone. The present invention is useful for reactions carried out in a fluidized bed reactor, such as the pyrolysis of silane containing gas into silicon.

14 Claims, 1 Drawing Sheet

INNER CORE HEATING IN FLUIDIZED BED

BACKGROUND OF THE INVENTION

This invention relates to an improved heated fluidized bed reactor and a method of using such reactor. In a preferred embodiment the improved heated fluidized bed reactor is useful in the production of polycrystalline silicon by the pyrolysis of silane containing gases.

A variety of means are well known in the art for supplying the necssary heat to fluidized bed reaction zones. A suitable heat transfer fluid and inductive or electrical resistance heaters are examples of direct means for supplying heat to the exteriors of conventional fluidized bed reactors. While adequate for the purposes of some fluidized bed applications, supplying heat to the exteriors of fluidized bed reactors is not entirely satisfactory for other fluidized bed applications because of the particular configurations and reactions occurring therein, particularly those reactions or operations where large amounts of heat are required. Undesirable side effects may result due to inefficient and/or insufficient introduction of heat into the fluidized bed reaction zone using conventional means of supplying heat to fluidized bed reactors.

The production of polycrystalline silicon from silane containing gases in a fluidized bed reaction zone is an example of the limitation of conventional means for heating fluidized beds. In this example, silicon particles are suspended in a fluidizing gas stream into which silane is injected. The process conditions are maintained so that the thermal decomposition of the silane occurs heterogeneously, i.e., the silane decomposes on the surface of the particles in the fluidized bed. The particles grow and enlarge due to the deposit of silicon thereon. Sufficiently large particles of silicon product are grown to allow for conventional removal of the product from a collection zone below the reaction zone. The byproduct hydrogen and other gases are separately removed as overhead gas from the reaction zone.

In the case of a polycrystalline silicon process, conventional means of supplying heat to the outer walls of a fluidized bed reaction zone result in an undesired coating of silicon on the wall of the reaction zone, possibly in preference to the desired deposition of the silicon onto the fluidized particles. The deposition of silicon on the reactor walls is partially a result of the elevated temperature of the reactor wall compared to the cooler temperature of the silicon particles. The deposition of silicon on the reactor walls has the effect of reducing the heat transfer efficiency into the reaction zone as well as the overall process efficiency.

It is known that in the pyrolysis of silane containing gas, heat may be supplied by capacitive heating of the fluidized bed reaction zone, as discussed in U.S. Pat. No. 4,292,344 to McHale. Other methods of heating, such as uniform induction coils, electrical resistance elements, and indirect gas fired heaters, have also been utilized on the outer walls of fluidized bed reactors and are disclosed in U.S. Pat. Nos. 3,012,861 to Ling and 3,012,862 to Bertrand, et al.

The present invention provides an improved heated fluidized bed reactor wherein heat may more effectively be introduced into the reaction zone. The reactor has widespread applications in fluidized bed operations requiring the input of heat. Exemplary of such operation is the production of high purity polycrystalline silicon.

SUMMARY OF THE INVENTION

The present invention relates to an improved heated fluidized bed reactor. The reactor includes a heated fluidized bed reaction zone having an outer periphery and an inner boundary. Heat is supplied to the outer periphery of the fluidized bed reaction zone by a first heat source, and a second heat source supplies heat to the inner boundary of the fluidized bed reaction zone.

In another embodiment, the present invention relates to a method of heating a fluidized bed reaction zone defined by an inner boundary and an outer periphery. The heat is supplied to the outer periphery of the fluidized bed reaction zone by a first heat source. A second heat source supplies heat to the inner boundary of the fluidized bed reaction zone. A particular application of this embodiment relates to a method for the production of high purity polycrystalline silicon by pyrolyzing silane containing gas in a heated fluidized bed reaction zone of silicon particles defined by an inner boundary and an outer periphery.

Other objects, features, and advantages of the present invention will be readily apparent from the following description of certain preferred embodiments thereof, taken in conjunction with the accompanying drawings. It is understood that variations and modifications may be effected without departing from the spirit and scope of the novel concepts of the disclosure.

DETAILED DESCRIPTION OF THE INVENTION

Figure 1:
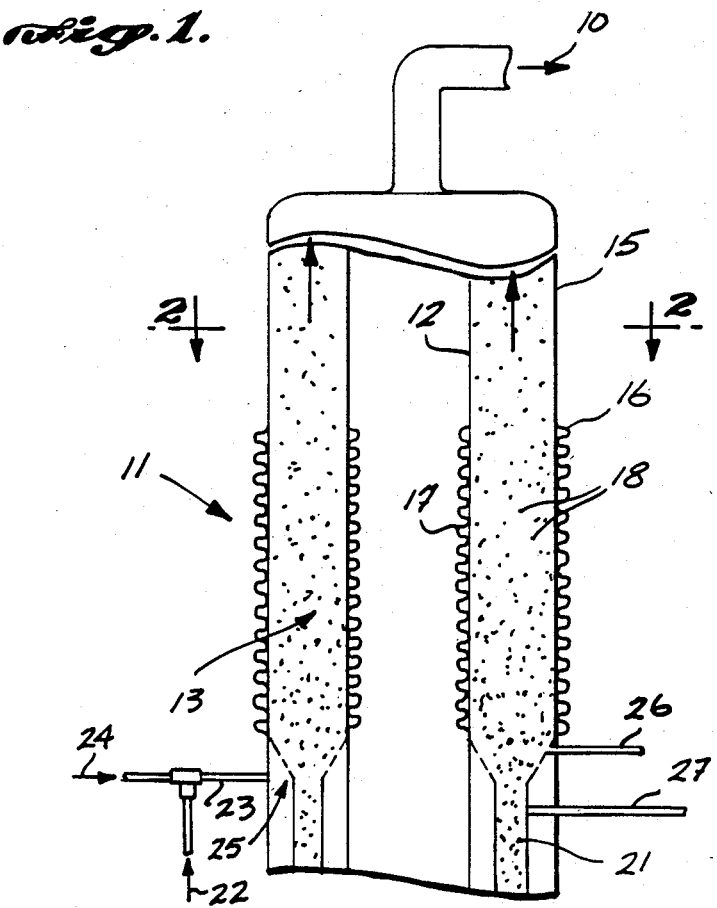
FIG. 1 illustrates a cross-sectional view of an annular inner core heated fluidized bed in accordance with a preferred embodiment of the present invention.

The present invention is described herein with regards to a preferred embodiment relating to the pyrolysis of silane containing gases to silicon in a fluidized bed of silicon particles. It is understood that the present invention is equally applicable to other types of fluidized bed reactions and operations requiring the input of heat. Examples of such operations include catalytic reactions, ion exchange reactions and separations, adsorption reactions, drying operations and the like.

As used herein, the term "heterogeneous decomposition" refers to the thermal reduction of silane or a halosilane containing gas to silicon that occurs in two or more phases, such as when the decomposition occurs at a boundary between a gas and a solid phase. The heterogeneous decomposition results in the deposition of silicon on either the suspended silicon particles in the fluidized bed or on the internal exposed surfaces of the fluidized bed reactor. "Homogeneous decomposition" occurs in a signle phase, such as the gas phase and produces high surface area silicon powder or dust in the micron to submicron size range. Generally, at a given temperature, the decomposition of silane and halosilanes will be either heterogeneous and/or homogeneous, depending on the concentration of the silane containing gas. Generally, a low silane containing gas feed concentration is desirable to maintain the decomposition of silane containing gas to silicon in a heterogeneous mode. However, a very low feed concentration of silane containing gas may not provide a high production rate of silicon.

As used herein, the term "silicon seed particle" means those particles of the fluidized bed that range in size from about 50 microns to about 400 microns. These particles grow and enlarge as silicon is deposited thereon, to be eventually collected as silicon product particles. The term "silicon product particles" refers to those silicon seed particles that have enlarged to a size of at least about 400 microns, and preferably to a size ranging from about 400 microns to about 1300 microns. The product particles segregate near the bottom of the reaction zone and are collected in a collection zone, allowing for removal by conventional means. The term "silicon particles" refers to both silicon seed particles and silicon product particles in the fluidized bed.

The term "silicon powder" refers to generally micron to submicron, high surface area, silicon particles resulting from the homogeneous decomposition of the silane containing gas.

As used herein, the phrase "silane containing gas" refers to both silane and/or halosilane containing gases unless otherwise indicated.

The term "fluidizing gas" or "fluidization gas" as used herein refers to the combination of silane containing gas and any other additional carrier gas that is added to the fluidized bed reactor to aid the fluidization of the silicon particles and/or to control the reaction rate or heat transfer.

Polycrystalline silicon may be prepared by introducing silane containing gas into a fluidized bed of silicon seed particles suspended in a reaction zone. These silicon particles are suspended by the upward flow of the fluidizing gas passing through the reaction zone. The fluidizing gas velocity through the reaction zone is maintained above the minimum fluidization velocity of the silicon particles. The temperature of the particles in the reaction zone is maintained between the decomposition temperature of the silane containing gas and the melting point temperature of silicon. The silane containing gas is decomposed to form silicon that deposits on the surface of the silicon particles. As silicon is deposited on the silicon particles, the particles enlarge and become segregated near the bottom of the fluidized bed in a collection zone disposed beneath the reaction zone. The larger silicon product particles are removed, either continuously or periodically, from the collection chamber by conventional means. The size of the large product particles is sufficient to allow easy handling, without undue contamination of the high purity material.

The silane containing gas may be introduced into the fluidized bed reaction zone from the bottom thereof in accordance with conventional practices, such as a gas distributor plate. This is also the location where seed particles to be fluidized may optionally be introduced into the fluidizing gas. In the gas distribution zone, the distributor surface is cooled to a temperature ranging from about 200° C. to about 400° C., by cooling water, nitrogen, or the like. The cooler temperatures are maintained to prevent the premature decomposition of silane containing gases. The silane containing gas may be introduced without dilution or the gas may be diluted with hydrogen or an inert carrier gas such as argon, helium or the like. In the decomposition of silane, by-product hydrogen is produced and can be recycled for use as a carrier gas for additional quantities of silane feed gas in the semi-continuous or continuous operations of a fluidized bed.

Any suitable silane containing gas capable of being thermally pyrolyzed or reduced in the gas phase to silicon may be used as a feed gas to the fluidized bed. Illustrative of such gases are silane and the halosilanes of chlorine, bromine, fluorine, and iodine. While the chlorosilanes, such as trichlorosilane, tetrachlorosilane, and dichlorosilane may be employed, particular advantages are realized through the use of silane. The pyrolysis of silane is slightly exothermic, goes substantially to completion, is irreversible, and is linitiated at a lower temperature of about 200° C., as compared to the higher pyrolysis temperature required for halosilane containing gases and the like. In addition, silane and its decomposition products, i.e., silicon and hydrogen, are non-corrosive and nonpolluting. In comparison, the chlorosilane decomposition is a reversible and incomplete reaction that results in the production of byproducts that are corrosive in nature. Accordingly, silane is a preferred gas for the use in the production of polycrystalline silicon, although other silane-containing gases may be utilized.

the production of polycrystalline silicon using the fluidized bed reactor method described herein requires a supply of silicon seed particles that are the substrates upon which the silicon deposits from the heterogeneous decomposition of the silane containing gas. In order to supply the silicon seen particles to the fluidized bed, it is possible to divert a small fraction of the silicon product material and suitably crush or grind this material into small, fine seed-sized particles. These seed particles may be reintroduced into the fluidized bed. Upon introduction, the small seed particles become growth sites for the deposition of silicon produced by the silane decomposition and accordingly will gradually increase in size and be withdrawn from the bed as silicon product particles.

The fluidizing gas velocity through the reaction zone is generally about two to eight times the minimum fluidization velocity necessary for fluidizing the particles of average diameter within the bed. As used herein, the term "average diameter" means one over the summation of the quotients of a given particle weight fraction and the respective diameter attributed to the particular fraction of particles. Preferably, the fluidizing gas velocity is about four to six times the minimum fluidization velocity necessary to fluidize the particles in the fluidized bed. The minimum fluidization velocity may be determined by conventional means known in the art, such as the equation:

$$\frac{1.75 D_p^2 \rho^2}{\Phi_s \epsilon^3 \mu^2} V_o^2 + \frac{150 D_p \rho (1 - \epsilon)}{\Phi_s^2 \epsilon^3 \mu} V_o - \frac{D_p^3 g \rho (\rho_p - \rho)}{\mu^2} = 0$$

wherein
$\overline{V}_o$ = minimum superficial gas velocity for fluidization (cm/s);
$D_p$ = average diameter of particles in the bed (cm);
$\rho$ = density of fluidization gas (g/cm$^3$);
$\rho_p$ = density of particles (g/cm$^3$);
$\Phi_s$ = sphericity of particles;
$\epsilon$ = void fraction in a bed of particles at minimum fluidization
$\mu$ = absolute viscosity of fluidizing gas (g/cm-s); and
g = gravitational acceleration (cm/s$^2$).

The minimum fluidization velocity is a strong function of gas viscosity and gas density, as well as average particle diameter, particle shape and void fraction. Thus, the minimum fluidization velocity may cover a wide range with small changes in these factors.

In the pyrolysis of silane, the minimum fluidization velocity is preferably calcuated for conditions as they exist near the gas distributor. Using these conditions, which include temperatures that are normally cooler than the rest of the reaction zone, it is possible to ensure the minimum fluidization velocity calculated to be sufficient to fluidize the entire bed. At the elevated temperatures of the reaction zone, the viscosity and density variables in the equation above are heat sensitive and may result in a minimum fluidization velocity that is not sufficient to fluidize the bed at the cooler temperatures of the lower portions of the bed. Therefore, by calculating a minimum fluidization velocity based on the cooler conditions, it is possible to ensure obtaining the lowest fluidization gas velocity that will fluidize the entire bed.

The fluidized bed processing conditions for the practice of the present invention are not limited by the particle or gas characteristics discussed herein. However, it is preferred that the fluidization conditions of the fluidized bed of particles be only slightly above the minimum fluidization condition for any given reaction or operation. The relatively high particle density of the fluidized bed associated with the minimum fluidization condition improves the effectiveness of the heat transfer within the reaction zone. In addition, the relatively moderate solid particle agitation possible and desired in the preferred embodiments of the present invention are advantageous in that the particles of the fluidized bed are not subjected to servere mechanical stresses that might erode the particles.

The fluidized bed reactor in accordance with a preferred embodiment of the present invention is generally a vertical vessel, wherein the desired fluidized bed reaction is carried out. The preferred fluidized bed reaction zone includes a substantially annular chamber created in the space between a larger peripheral outer wall and a smaller inner wall that is concentrically disposed within the larger outer wall. In this preferred embodiment, the configuration may be thought of as a small cylinder, i.e., the inner wall of the reaction zone, disposed within a larger cylinder, i.e., the outer wall of the reaction zone. The annular space between the inner and outer cylinders makes up the fluidized bed reaction zone. Although the preferred embodiment describes an annular reaction zone and cylindrical reaction vessel, the present invention is equally applicable to other shapes and configurations of the reaction vessel and reaction zone as long as an inner annulus-type space is provided.

The particular diameters of the inner and outer walls of the preferred annular fluidized bed reaction zone will depend upon factors that similarly affect the design of conventional fluidized bed reactors. These factors include particle size, height of the bed, degree of fluidization desired, fluidization gas velocity, product particle size, density of bed particles and the like. Reference is made to Perry and Chilton, *Chemical Engineer's Handbook,* Section 20, McGraw Hill, 1973, pp. 64–74, and McCabe and Smith, *Unit Operations of Chemical Engineering,* 3rd ed., 1976, McGraw Hill, pp. 159–168, wherein a more detailed description of fluidized bed reactor design may be found, the contents of which are expressly incorporated herein by reference. The preferred dimensions will primarily be dependent upon the economics of design. The reaction zone must not be too narrow or this leads to process inefficiencies due to low output; however, the reaction zone must not be too wide or this leads to increased energy costs associated with inefficient heat transfer and fluidization difficulties.

In a preferred embodiment, wherein silane containing gas is pyrolyzed to silicon, the diameter of the inner reaction zone wall preferably ranges from about 15 cm to about 117 cm, most preferably, from about 20 cm to about 30 cm. The diameter of the outer reaction zone wall preferably ranges from about 20 cm to about 122 cm, and most preferably, from about 38 cm to about 69 cm. In the preferred embodiment, the outer cylinder that forms the outer periphery of the reaction zone is concentrically positioned in relationship to the inner boundary of the reaction zone. In order to ensure the creation of an annular reaction zone within the reaction vessel, the height of the outer cylinder is generally equal to or greater than the height of the inner cylinder defining the reaction zone inner wall. The diameter of the inner cylinder is about 10 to about 95 percent of the diameter of the outer cylinder, preferably, the diameter of the inner cylinder ranges from about 30 to about 75 percent of the diameter of the outer cylinder.

In accordance with a preferred embodiment of this invention, the annular chamber between the inner and outer cylinders forms the reaction zone and is occupied by a fluidized bed of silicon particles. The silane containing gases and fluidization gases pass upwardly through the bed of silicon particles. The reaction zone is maintained at a temperature that promotes the heterogeneous decomposition of the silane containing gases to silicon. The silicon is preferably deposited upon the silicon particles in the reaction zone as opposed to the exposed surfaces of the reaction zone. The temperature of the particles in the reaction zone is generally between the temperature that silane begins to heterogeneously decompose (i.e., 200° C.) and the temperature that silicon melts, (i.e., 1400° C.). Preferably, the particles in the reaction zone are maintained at a temperature ranging from about 550° C. to about 1000° C. In order to provide these reaction zone temperatures, heat must be supplied to the reaction zone. By using the present invention in a silane pyrolysis reactor, it is possible to maintain the reaction zone walls at temperatures ranging from about 200° C. to about 1400° C., preferably 550° C. to about 1000° C.

One factor that affects the amount and efficiency of heat transfer into a fluidized bed reaction zone is the surface area available for heat transfer. Generally, the larger the surface area available for heat transfer, the greater the heat transfer for a given temperature. In other words, in order to efficiently provide the elevated temperatures of the reaction zone, it is desirable to provide a large surface area for heat transfer into the reaction zone. The larger surface area available for heat transfer allows for a more efficient introduction of heat into the reaction zone. The present invention provides a large surface area for heat transfer by using a secondary heat source that includes the wall defining the inner boundary of the fluidized bed reaction zone. The heat is supplied to the reaction zone from both the interior wall and the exterior wall of the fluidized bed reaction zone.

The heat sources that supply heat to the inner and the outer walls of the reaction zone are conventional type heating sources such as resistive heating sources, inductive heating sources, and combinations thereof. Examples of such heat sources include resistance coil heaters, liquid heating systems, heat exchanger systems, and the like, conventionally used in the art of providing heat to reaction vessels. The particular type of heat source is not critical to the present invention, as long as the heat source supplies heat to both the interior and the exterior walls of the reaction zone in accordance with the present invention. Preferably, in the practice of the present invention, a resistive type of heating source is employed.

The interior boundary of the reaction zone increases the effective surface area available for heat transfer by about 10 percent to about 95 percent of the surface area of the exterior wall. Preferably, the interior boundary provides at least about 30 percent to about 75 percent more surface area for heat transfer. The increased surface area for heat transfer allows more heat to be introduced into the reaction zone at a given temperature for a given volume of the fluidized bed compared to the amount of heat that can be supplied to the reaction zone by a surface of lesser area. The present invention will become more apparent from the following description of a preferred embodiment, when considered together with the accompanying drawings. The drawings are set forth as being merely illustrative of a preferred embodiment of the invention and are not intended in any way to be limitative thereof.

Referring to FIG. 1, silane gas in line 27 and hydrogen/fluidizing gas in line 24 are combined and fed through line 23 to the bottom of the fluidized bed reactor 11. The feed gas entering through line 23 enters the fluidized bed reaction zone 13 through the perforations in the perforated gas distributor plate 25. The silane containing gas thermally decomposes to silicon in the fluidized bed reaction zone 13 and deposits on the surface of the silicon seed particles 18. The silicon depositing on the surface of hte silicon seed particles 18 causes the silicon seed particles 18 to grow and enlarge until they become silicon product particles 21. The silicon product particles 21 segregate in a collection zone near the bottom of the fluidized bed reaction zone 13. The silicon product particles 21 are removed from the bottom of the fluidized bed reactor 11 through conduit 27. The by-product gas and fluidization gases pass out the top of the fluidized bed reaction zone 13 through conduit 10.

Because silicon seed particles 18 are removed as enlarged silicon proudct particles 21, it is necessary to supply additional silicon seed particles 18 through conduit 26. The silicon seed particles 18 introduced through line 26 may be produced by recovering a portion of the silicon product particles 21 and grinding the silicon product particles 21 into smaller silicon seed particles 18.

The fluidized bed reaction zone 13 resides in the annular space between the inner reaction zone wall 12 and the outer vessel wall 15. The silicon seed particles 18 in the fluidized bed reaction zone 13 are suspended by the fluidization gases entering through conduit 23 and passing upwardly through the fluidized bed reaction zone 13.

Heat is supplied to the fluidized bed reaction zone 13 by a first heating means 16 and a second heating means 17. First heating means 16 supplies heat to the outer vessel wall 15 and second heating means 17 supplies heat to the inner reaction zone wall 12. Because both the inner 12 and outer 15 walls of the fluidized bed reaction zone 13 are used as heating surfaces, the total surface area available for heat transfer per unit volume of the bed is increased and, therefore, the total amount of heat transferred into the fluidized bed reaction zone 13 for a given temperature is increased compared to the heat transferred into a reaction zone where heat is supplied only to the outer wall of the reaction zone.

Figure 2:
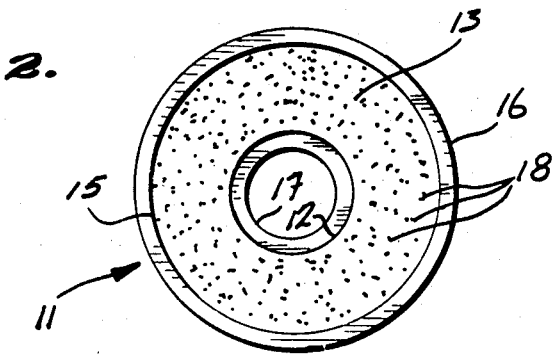
FIG. 2 is a top view of the annular inner core heated fluidized bed reactor in accordance with a preferred embodiment of the present invention.

Referring to FIG. 2, the fluidized bed reaction zonen 13 of silicon seed particles 18 occupies the annular space between the inner reaction zone wall 12 and the outer vessel wall 15. Heat is supplied to the inside of the fluidized bed reaction zone 13 by an inner heating means 17. Heat is supplied to the outside of the fluidized bed reaction zone 13 by the outer heating means 16.

For comparison purposes only, the following Comparative Example is set forth. Example 1 is presented to illustrate the invention, however, the Example is not intended as a limitation thereof.

Comparative Example

A conventional fluidized bed having a diameter of 29.5 cm containing silicon particles ranging in size from about 300–800 microns is fluidized by a gas mixture of 20 volume percent silane and 80 volume percent hydrogen. The bed is lined with quartz liners having a thickness of 0.65 cm and contained within a stainless steel shell having a diameter of 50.0 cm that is surrounded by an insulation layer of 10.0 cm. Heat is supplied to the fluidized bed through the quartz liners by Kanthal heaters having an inner diameter of 40.0 cm and operating at 1200° C. disposed on the interior wall of the stainless steel shell. The heaters define a fluidized bed height of 150.0 cm. Three flanges having an outer diameter of 82.0 cm and a thickness of 9.0 cm are used to join abutting portions of the vertical stainless steel shell, as well as to join the shell to the gas distributor and the exhaust portion of the reactor. The gas distributor is positioned at the bottom of the bed and provides passages for the entry of the fluidizing gas and exit of the product particles. The distributor is a 5.0 cm high conical member that has a diameter at its large end of 29.5 cm and a diameter at its small end of 5.0 cm. The stainless steel shell and quartz liner extend 133.0 cm above the fluidized bed of particles.

The pressure in the fluidized bed reactor is 2.0 atm and the superficial fluidizing gas velocity at the distributor is 70.0 cm/sec. The temperature at the top of the fluidized bed is 923° K. and the temperature at the bottom is 823° K. The temperature of the gas distributor is 523° K. The void fraction of the bed in its fluidized state is 0.4. Heat transfer characteristics of the fluidized bed are summarized below:

| | |
|---|---|
| Heat Transfer Coefficient Between Wall and Bed | 0.00717 cal/cm$^2$ sec °C. |
| Thermal Conductivity of Liner | 0.0116 cal/cm sec °C. |
| Emissivity of Liner | 0.60 |
| Thermal Conductivity of Insulation | 3.45 × 10$^{-5}$ cal/cm sec °C. |
| Heat Capacity of Silicon | 0.168 cal/gm °C. |

Taking into consideration the heat losses and inputs attributable to the:
1. Distributor
2. Product and effluent stream
3. Flanges
4. Radiation from top and bottom of the bed
5. Insulation
6. Reaction of silane gas
7. Heaters and assuming:
1. Temperature of the bed is constant everywhere except in the small region at the bottom of the bed;
2. Temperature of the liner is constant;
3. Distributor temperature is constant;
4. Heat transfer between the bed and the distributor is based only on the temperature of the bed and the distributor;
5. Heat transfer between the heaters and the liners occurs by radiation only;
6. Feed gases enter at ambient temperatures (300° K.) and leave at the temperature of the bed; and
7. Bed and heaters radiate as black bodies;

the heat transfer rate from the Kanthal heaters to the bed is determined to be 0.656 KW/cm of bed height.

EXAMPLE 1

A fluidized bed of silicon particles having a diameter ranging from 300 to 800 microns occupying the annular region between two concentric cylinders is provided with Kanthal heaters on both the inner and outer surface defining the annular region. The inside diameter of the bed is 22.9 cm and the outside diameter is 38.1 cm, this fluidized bed has a cross-sectional area equal to 730.0 $cm^2$ which is equal to the cross-sectional area of the conventional fluidized bed of the Comparative Example. The fluidized bed has 12 conical gas distributors positioned beneath the annular bed for introducing the fluidizatioin gas of 20 volume percent silane and 80 volume percent hydrogen and allowing the larger particles to settle out of the bed.

The conical distributors are 1.3 cm high and have a diameter at their large end of 7.6 cm and a diameter at their smaller end of 2.5 cm. The exterior diameter of the bed is defined by a quartz liner having a thickness 0.65 cm. The liner is contained within a stainless steel shell having a diameter of 62.5 cm and surrounded by an insulation layer of 10.0 cm. The interior diameter (22.9 cm) of the bed is defined by a quartz liner having a thickness of 0.65 cm. The Kanthal heaters are positioned on the interior wall of the outer stainless steel shell and supply heat to the fluidized bed through the outer liner. Kanthal heaters having a smaller diameter than the inner quartz liner are supported interior of the inner quartz liner for supplying heat to the fluidized bed through the inner quartz liner. The Kanthal heaters mounted on the outer stainless steel shell have an outer diameter of 62.5 cm and an inner diameter of 52.5 cm. The heaters supported interior of the inner liner have a diameter of about 10 cm. The heaters are operated at 1200° C. and define a fluidized bed height of 92.7 cm. Three flanges on the outside shell having an outer diameter of 94.5 cm and a thickness of 9.0 cm are used to join abutting portions of the stainless steel shell, as well as to join the shells to the gas distributors and exhaust portion of the reactor. The stainless steel shells and quartz liners extend 170.3 cm above the fluidized bed of particles.

The pressure in the fluidized bed reactor is 2 atm and the superficial fluidizing gas velocity at the distributor is equal to the minimum fluidization velocity for 800 micron diameter particles, that is about 70.0 cm/sec. The temperature at the top of the fluidized bed is 923° K. and the temperature at the bottom is 823° K. The temperature of the gas distributor is 523° K. The void fraction of the bed in its fluidized state is 0.4 and the heat transfer characteristics of the fluidized bed are the same as described in the Comparative Example.

Again, taking into consideration the same heat losses and inputs described in the Comparative Example and making the same assumptions used in the Comparative Example, the heat transfer rate from the Kanthal heaters to the bed is determined to be 1.35 KW/cm of bed height, compared to 0.656 KW/cm of bed height in the Comparative Example.

The present invention allows more heat to be provided to a fluidized bed of a given height and cross-sectional area compared to conventional methods of heating a fluidized bed of similar dimensions. The increased heat transfer rate per unit bed height permits fluidized bed reactions to be carried out in beds of lower depth without decreasing the overall heat transfer rate into the bed which is normally associated with reducing the bed height of conventional reactors. The shallower beds exhibit better hydrodynamic behavior compared to the deeper beds and also allow the heat flux to be applied closer to the primary reaction zones that normally occupy the lower regions of the reactor.

The present invention has been described in relation to various embodiments, including the preferred parameters. One of ordinary skill, after reading the foregoing specification, will be able to effect various changes, substitutions of equivalents, and other alterations without departing from the broad concepts disclosed herein. It is therefore intended that the scope of Letters Patent granted hereon will be limited only by the definition contained in the appended claims and equivalents thereof.

What is claimed is:
1. A heated fluidized bed reactor comprising:
   (a) a vessel;
   (b) a heated fluidized bed within an annular reaction zone located within the vessel and defined by an outer periphery means and an inner boundary wall, said inner boundary wall also defining and bounding an inner cavity, said inner boundary wall excluding said fluidized bed from within said inner cavity, said annular reaction zone being the only site within the vessel in which the fluidized reaction occurs and said annular reaction zone having no communication with said inner cavity;
   (c) means for heating the reaction zone including a first heat source means for supplying heat to the outer periphery means of the fluidized bed reaction zone, and a second heat source means for supplying heat to the inner boundary wall of the fluidized bed reaction zone; and
   (d) a fluidizing means for providing fluidization in the reaction zone.
2. The heated fluidized bed reactor of claim 1, wherein the fluidized bed reaction zone is an annular chamber defined by said outer periphery means comprising a larger diameter cylindrical outer periphery wall, and said annular chamber being further defined by said inner boundary wall positioned concentrically within said larger diameter cylindrical outer periphery wall, said inner boundary wall also being cylindrical.
3. The heated fluidized bed reactor of claim 2, wherein the diameter of the inner boundary wall ranges from about 10 percent to about 95 percent of the diameter of the larger cylindrical outer periphery wall.
4. The heated fluidized bed reactor of claim 1, wherein the first and second heat source means are selected from the group consisting of conductive heating, resistive heating and inductive heating sources.

5. The heated fluidized bed reactor of claim 1, wherein the surface area of the inner boundary wall of the reaction zone available for heat transfer ranges from about 10 percent to about 95 percent of the heat transfer surface area of the outer periphery means.

6. The heated fluidized bed reactor of claim 2, wherein the diameter of the inner boundary wall of the reaction zone ranges from about 15 cm to about 117 cm and the diameter of the cylindrical outer periphery wall ranges from about 20 cm to about 122 cm.

7. The heated fluidized bed reactor of claim 1, wherein the diameter of the inner boundary wall ranges from about 15 cm to about 117 cm and the diameter of the outer periphery means ranges from about 20 cm to about 122 cm.

8. The heated fluidized bed reactor of claim 1, wherein the outer periphery means of the annular reaction zone is a wall of said vessel.

9. A heated fluidized bed reactor used for the production of high purity polycrystalline silicon by pyrolyzing a silane containing gas comprising:
    (a) a vessel;
    (b) a heated fluidized bed within an annular reaction zone located within the vessel and defined by an outer periphery means and an inner boundary wall, said inner boundary wall also defining and bounding an inner cavity, said inner boundary wall excluding said fluidized bed from within said inner cavity, said annular reaction zone being the only site within the vessel in which the fluidized reaction occurs and said annular reaction zone having no communication with said inner cavity;
    (c) means for heating the reaction zone including a first heat source means for supplying heat to the outer periphery means of the annular fluidized bed reaction zone, the outer periphery means ranging in diameter from about 38 cm to about 69 cm, and a second heat source means for supplying heat to the inner boundary wall of the annular fluidized bed reaction zone, the inner boundary wall ranging in diameter from about 20 cm to about 30 cm; and
    (d) a fluidizing means for providing fluidization in the reaction zone.

10. A method of heating an annular fluidized bed within a reaction zone included within a vessel, said reaction zone being defined by an inner boundary wall and an outer periphery means, said inner boundary wall also defining and bounding an inner cavity, said inner boundary wall also excluding said fluidized bed from within said inner cavity, comprising;
    (a) supplying heat to the outer periphery means of the annular fluidized bed reaction zone; and
    (b) supplying heat to the inner boundary wall of the annular fluidized bed reaction zone, wherein the said annular fluidized bed reaction zone is the only site within the vessel in which the fluidized reaction occurs and wherein said annular reaction zone has no communication with said inner cavity.

11. The method of claim 10, wherein the fluidized bed reaction zone is an annular chamber defined by said outer periphery means comprising a larger diameter cylindrical outer periphery wall, and said annular chamber being further defined by said inner boundary wall positioned concentrically within said larger diameter cylindrical outer periphery wall, said inner boundary wall also being cylindrical.

12. The method of claim 11, wherein the surface area of the inner boundary wall of the reaction zone available for heat transfer ranges from about 10 to about 95 percent of the total heat transfer surface area of the outer periphery wall.

13. The method of claim 11, wherein the diameter of the inner boundary wall ranges from about 20 cm to about 30 cm and the diameter of the outer periphery wall ranges from about 38 cm to about 69 cm.

14. The method of claim 10, wherein the first and second heat source means are resistive heating means.

* * * * *

UNITED STATES PATENT AND TRADEMARK OFFICE
CERTIFICATE OF CORRECTION

PATENT NO. : 4,904,452
DATED : February 27, 1990
INVENTOR(S) : Arun Acharya; William E. BeVier It is certified that error appears in the above-identified patent and that said Letters Patent is hereby corrected as shown below:

Column 2, line 60, "signle" should read --single--.

Column 4, line 12, "linitiated" should read --initiated--.

Column 7, line 28, "line 27" should read --line 22--.

Column 7, line 37, "hte" should read --the--.

Column 7, line 48, "proudct" should read --product--.

Column 8, line 7, "zonen" should read --zone--.

Signed and Sealed this

Fourteenth Day of January, 1992

Attest:

HARRY F. MANBECK, JR.

*Attesting Officer*  *Commissioner of Patents and Trademarks*